United States Patent
Cieloch et al.

(10) Patent No.: US 11,355,968 B2
(45) Date of Patent: Jun. 7, 2022

(54) WIRELESS POWER TRANSMISSION SYSTEM AND METHOD WITH INCREASED SAFETY AGAINST RADIATION EXPOSURE

(71) Applicant: Carrier Corporation, Palm Beach Gardens, FL (US)

(72) Inventors: Tomasz Cieloch, Pomorskie (PL); Tomasz Lisewski, Gdańsk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/091,816

(22) Filed: Nov. 6, 2020

(65) Prior Publication Data
US 2021/0143866 A1 May 13, 2021

(30) Foreign Application Priority Data
Nov. 8, 2019 (EP) .................... 19208042

(51) Int. Cl.
*H02J 50/60* (2016.01)
*H02J 50/80* (2016.01)
(Continued)

(52) U.S. Cl.
CPC .............. *H02J 50/60* (2016.02); *G08B 13/00* (2013.01); *G08B 13/19636* (2013.01);
(Continued)

(58) Field of Classification Search
CPC ............ H02J 50/60; H02J 50/80; H04B 5/00; G08B 13/00
See application file for complete search history.

(56) References Cited

U.S. PATENT DOCUMENTS

| 8,129,864 B2 | 3/2012 | Baarman et al. |
| 8,547,057 B2 | 10/2013 | Dunworth et al. |

(Continued)

FOREIGN PATENT DOCUMENTS

| EP | 2890021 A1 | 7/2015 |
| EP | 2754222 B1 | 11/2015 |

(Continued)

OTHER PUBLICATIONS

European Search Report for Application No. 19208042.2; dated Apr. 28, 2020; 10 Pages.

(Continued)

*Primary Examiner* — Adi Amrany
(74) *Attorney, Agent, or Firm* — Cantor Colburn LLP (57) ABSTRACT

A wireless power transmission system for transmitting power to energy receiving equipment is provided. The system includes: an intruder alarm, wherein the intruder alarm comprises a person detection system that is arranged to trigger the intruder alarm when the intruder alarm is set and the detection system is activated; a power source for wirelessly transmitting high power packets and low power packets; and energy receiving equipment for receiving the high power packets and low power packets from the power source, wherein the system is arranged such that the power source can only transmit high power packets when the intruder alarm is on and not triggered. A method of using the system is also provided.

15 Claims, 3 Drawing Sheets

(51) Int. Cl.
  *H02J 50/12* (2016.01)
  *G08B 13/196* (2006.01)
  *H04B 5/00* (2006.01)
  *G08B 13/00* (2006.01)

(52) U.S. Cl.
  CPC .............. *H02J 50/12* (2016.02); *H02J 50/80* (2016.02); *H04B 5/0037* (2013.01)

(56) References Cited

U.S. PATENT DOCUMENTS

| | | | |
|---|---|---|---|
| 8,884,581 | B2 | 11/2014 | Widmer et al. |
| 8,928,284 | B2 | 1/2015 | Carobolante |
| 9,030,161 | B2 | 5/2015 | Lu et al. |
| 9,404,954 | B2 | 8/2016 | Roy et al. |
| 9,525,311 | B2 | 12/2016 | Menegoli |
| 9,893,554 | B2 | 2/2018 | Bell et al. |
| 9,941,754 | B2 | 4/2018 | Leabman et al. |
| 10,020,678 | B1 | 7/2018 | Leabman |
| 10,033,222 | B1 | 7/2018 | Leabman |
| 10,122,221 | B2 | 11/2018 | Zeine et al. |
| 10,135,295 | B2 | 11/2018 | Leabman |
| 10,291,056 | B2 | 5/2019 | Bell et al. |
| 10,396,599 | B2 | 8/2019 | Bae |
| 2011/0021160 | A1 | 1/2011 | Vullers et al. |
| 2016/0079799 | A1 | 3/2016 | Khat |
| 2018/0091001 | A1 | 3/2018 | Meichle |
| 2021/0044157 | A1* | 2/2021 | Kawamae ............... H02J 50/80 |

FOREIGN PATENT DOCUMENTS

| | | | |
|---|---|---|---|
| EP | 2579424 | B1 | 7/2016 |
| EP | 2396896 | B1 | 3/2018 |
| EP | 3014741 | B1 | 3/2018 |
| EP | 3035975 | B1 | 11/2018 |
| EP | 3238323 | A1 | 8/2019 |
| WO | 2010093723 | A1 | 8/2010 |
| WO | 2014210139 | A1 | 12/2014 |
| WO | WO-2019180895 | A1 * | 9/2019 ............... H02J 50/10 |

OTHER PUBLICATIONS

Talla, Vamsi et al., "Powering the Next Billion Devices with Wi-Fi" Univeristy of Washington; May 26, 2015; 14 Pages.

Unknown Author; "ICNIRP Guidelines"; International Commission on Non-Ionizing Radiation Protection; Health Physics; Apr. 1998; vol. 74; No. 4; 38 Pages.

* cited by examiner

WIRELESS POWER TRANSMISSION SYSTEM AND METHOD WITH INCREASED SAFETY AGAINST RADIATION EXPOSURE

FOREIGN PRIORITY

This application claims priority to European Patent Application No. 19208042.2, filed Nov. 8, 2019, and all the benefits accruing therefrom under 35 U.S.C. § 119, the contents of which in its entirety are herein incorporated by reference.

TECHNICAL FIELD OF INVENTION

The present invention relates to a wireless power transmission system and a method of transmitting wireless power. The wireless charging system and method may be used when it is important to limit/avoid the possibility of harmful radiation exposure to persons.

BACKGROUND OF THE INVENTION

The use of wireless sensors is becoming more commonplace, including in modern security and alarm systems. For example, it is common for security systems to include wireless motion detectors, cameras and/or microphones etc. Using wireless sensors for such applications enables simple retrofitting of buildings without the need for wiring electrical power directly to the sensors. However, wireless sensors are typically powered by a battery, which can power the sensor only for a limited amount of time before it needs replacing or recharging. The maintenance of such systems can therefore be time consuming and troublesome. One solution is to charge the sensors remotely using wireless power, for example electromagnetic waves in the radio frequency band, also referred to as radio frequency ("RF") charging.

A conventional resonant type wireless charge system includes a power transmitter equipped with a first resonator and a power receiver equipped with a second resonator. When the second resonator is located in an electromagnetic (EM) field generated by the first resonator, the second resonator absorbs the EM field and power transmission occurs.

An issue with such conventional systems is that any object located within the EM field generated by the first resonator may absorb a proportion of radiation from the EM field. If, for example, a person is located in the EM field, the proportion of radiation they absorb may exceed safety regulations.

In order to avoid this, the wireless charging systems may be arranged to not transmit power when a person is present.

For example, EP 3014741 discloses a wireless charging system in which human exposure to radiation is limited by the system being configured to deactivate the power transmitter upon indication of an individual within a certain area.

However, this could prevent charging for a long period of time is the person does not leave the monitored area for a long period of time.

The International Commission on Non-Ionizing Radiation Protection (ICNIRP) has issued guidelines for limiting exposure to time-varying electric, magnetic and electromagnetic fields in the form of the IEC 62311 and IEC 62479 international standards. Following these guidelines provides protection against known adverse health effects.

However, following these guidelines may limit the rate of power transmission that is possible via the wireless power transmission system, thereby reducing its effectiveness. This may also limit the maximum distance to which power can be transmitted as the strength of the field decreases with distance from the power transmitter.

Therefore, there is a need for a wireless power transmission system that avoids potential adverse health effects to persons whilst ensuring adequate and/or reliable charging of devices.

SUMMARY OF THE INVENTION

In one aspect, the present invention provides a wireless power transmission system for transmitting power to energy receiving equipment, the system comprising: an intruder alarm, wherein the intruder alarm comprises a detection system (e.g. person detection system) that is arranged to trigger the intruder alarm when the intruder alarm is set and the detection system is activated; a power source for wirelessly transmitting high power packets and low power packets; and energy receiving equipment for receiving the high power packets and low power packets from the power source, wherein the system is arranged such that the power source can only transmit high power packets when the intruder alarm is set and not triggered.

By ensuring that the power source can only transmit high power packets when the intruder alarm is set and not triggered, the present system may provide two-fold protection against radiation exposure to persons. First, the alarm must be set, on, or "armed" by a user for high power packets to be sent. A conventional alarm system is typically only ever armed when a user believes that no persons are present in the monitored area. This may ensure that any persons of which the user is aware are not exposed to any radiation from high power packets transmitted by the power source. Secondly, by ensuring that the power source can only transmit high power packets when the intruder alarm is not triggered, exposure to persons which the user is unaware of (but the alarm system detects, such as an intruder) may also be prevented. As such, the system may provide an improved wireless power transmission system with increased safety against radiation exposure.

The detection system may be activated if a person is detected in a predetermined area.

Whilst aspects of the present invention are described in relation to radiation exposure to persons, they may also be utilised to prevent radiation exposure to animals or any other object that is detected in the monitored area and for which it may be necessary to limit radiation exposure.

The setting, turning on, or arming of the intruder alarm may require intentional action of a user.

Any reference herein to the alarm being set, on, or armed may refer to the alarm being put into an active state in which it can be triggered by the detection system.

The wireless transmission system and in particular the intruder alarm/detection system may be used as part of a security method and/or security system.

The power source may be arranged to transmit power packets when one or more devices requires power. The system, e.g. a control unit and/or the devices themselves, may monitor the power requirements of the devices. When power is required, e.g. when an energy store of a device is below a certain level and/or the current or expected power usage of the device is above a certain level, the system, e.g. the control unit or device, may send a request for power to the power source.

The power source may be arranged to transmit power packets when a request for power is received at the power source. Thus the power source may only transmit power when a demand for power is received. The system may be arranged so that a request/demand for power is sent by a control unit and/or energy receiving equipment.

The system may be arranged such that the power source can transmit low power packets when the intruder alarm is set and triggered. The system may also be arranged such that the power source can transmit low power packets when the intruder alarm is off (i.e. not set). This may ensure that some, lower level of power is always available (if required) whilst still minimizing radiation exposure. This may be particularly important in security systems when the intruder alarm is set but triggered. This is because it may be needed for wireless power to still be available to power devices that monitor any intruders. For example, if the detection system comprises a video camera that is wirelessly powered, in the case of an intruder triggering the alarm, low power packets could still be sent to the video camera in order to power it and thus allow capture and/or streaming of a video of the intruder.

Any aspect of the present invention may be used in a predetermined space. The intruder alarm/detection system may monitor a predetermined space for persons. The power source may transmit power in the predetermined space (i.e. over the whole predetermined space or over an area within the predetermined space). The power source may be within the predetermined space. The predetermined space may be a building or property such as a house, workplace or other protected/secured premises. There may be a plurality of predetermined areas within the space. Each area may be a room and/or a portion of a room. Thus, the predetermined space may comprise a plurality of rooms.

The detection system (e.g. person detection system) may comprise one or more detectors. The system may comprise at least one detector in each predetermined area or room that is monitored by the detection system.

The detectors may be motion detectors.

The motion detectors may comprise infrared, radar and/or ultrasound detectors.

The detection system may comprise motion detectors that detect passive infrared (PIR) signals generated as body heat (infrared energy). By "passive" it may be meant that the sensors of the systems detect signals produced by other bodies but do not emit these signals themselves. The sensor of such a system may detect changes in heat and thus movement of heat sources in the region which it monitors, dividing this region into a protective "grid." If a moving object is present in too many grid zones and/or the infrared energy levels change rapidly across the grid zones, the sensors may be tripped, thus triggering the alarm.

Alternatively or additionally, the detection system may comprise active motion detectors (i.e. after an emission by the detection system itself). For example, in the case of infrared, radar and/or ultrasound, signals may be emitted by the detection system via transmitters and reflected by a body before being received back at the detection system and analyzed in order to detect a movement of the body and generate motion data. Such signals work in a similar manner to radar to detect a movement. In this way, the detection system may utilize active signals such as radar (e.g. microwaves) or ultrasound. By "active" it is meant that sensors emit signals and detect a corresponding reflected signal. For example, sensors may emit radio or microwave pulses and measure the reflection off a moving object in order to detect a change in its location and thus a movement of the object. Sensors can also emit infrared signals from an LED following a similar principle.

The motion detection system may use (i.e. the detectors may be/comprise) video cameras and/or microphones to detect persons in the predetermined space or area.

The detection system may comprise (i.e. the detectors may be/comprise) door and/or window sensors that can indicate if a person has entered the predetermined space/area.

The detection system may comprise (i.e. the detectors may be/comprise) glass break detectors or shock detectors that can indicate if a person has broken into the predetermined space/area.

Any combination of one or more of the above described sensors/detectors may be used by the detection system of the intruder alarm to detect persons in the predetermined space/area. The skilled person will also appreciate that any known detection system (e.g. person detection system) may also be utilised in the present invention to monitor the predetermined space/area.

The detection system may be arranged so that it is activated when the sensor(s)/detector(s) detect a person in a predetermined space/area and/or entering a predetermined space/area and/or near a predetermined space/area.

The wireless power transmission system may be for charging and/or powering one or more wirelessly powered device(s).

Any of the above described sensors/detectors and/or any component(s) of the intruder alarm/detection system may be charged or powered wirelessly by the wireless power transmission system. These sensors/detectors and/or components may be referred to as wirelessly powered devices.

The wirelessly powered device(s) may additionally or alternatively comprise one or more devices that are not part of the intruder alarm. For example the wirelessly powered device(s) may comprise consumer electronics, such as mobile phones, fitness trackers, laptops etc. The wirelessly powered device(s) may comprise lighting equipment and/or climate control equipment such as a thermostat etc. The wirelessly powered device(s) may comprise any wireless product requiring power in a building or home.

The wirelessly powered device(s) may each comprise the energy receiving equipment. The wirelessly powered device(s) may be powered and/or charged by the energy receiving equipment receiving the high power packets and/or low power packets. The wirelessly powered device(s) may each comprise a rechargeable energy store, e.g. a rechargeable battery. The rechargeable energy store may be electrically connected to the energy receiving equipment.

The power source may comprise one or more power transmitters. The power source may comprise at least one transmitter in each area/room of the predetermined space that is monitored by the detection system.

The power transmitters may be configured to generate an electromagnetic field and the power transmitters may be radio-frequency ("RF") antennas. Alternatively, or in addition, other power transmitters such as inductive resonance loops or magnetic antennas may be used.

The power source may be a Wi-Fi router. The Wi-Fi router may be a conventional Wi-Fi router. For example, as discussed in Powering the Next Billion Devices with Wi-Fi, Talla et al, 26 May 2015, existing Wi-Fi chipsets such as a Wi-Fi router can be arranged to provide far field wireless power without compromising the network's communication performance. Repurposing Wi-Fi networks for power delivery may ease the deployment of the wireless power transmission system without additional power infrastructure. Furthermore, Wi-Fi uses OFDM, an efficient waveform for power delivery and sensors and mobile devices are increasingly equipped with 2.4 GHz antennas for communication which may also be used for Wi-Fi power harvesting with a negligible footprint on the size of the device.

| Frequency range | E-field strength (V m$^{-1}$) | H-field strength (A m$^{-1}$) | B-field (μT) | Equivalent plane wave power density $S_{eq}$ (W m$^{-2}$) |
|---|---|---|---|---|
| up to 1 Hz | — | $3.2 \times 10^4$ | $4 \times 10^4$ | — |
| 1-8 Hz | 10,000 | $3.2 \times 10^4/f^2$ | $4 \times 10^4/f^2$ | — |
| 8-25 Hz | 10,000 | 4,000/f | 5,000/f | — |
| 0.025-0.8 kHz | 250/f | 4/f | 5/f | — |
| 0.8-3 kHz | 250/f | 5 | 6.25 | — |
| 3-150 kHz | 87 | 5 | 6.25 | — |
| 0.15-1 MHz | 87 | 0.73/f | 0.92/f | — |
| 1-10 MHz | $87/f^{1/2}$ | 0.73/f | 0.92/f | — |
| 10-400 MHz | 28 | 0.073 | 0.092 | 2 |
| 400-2,000 MHz | $1.375f^{1/2}$ | $0.0037f^{1/2}$ | $0.0046f^{1/2}$ | f/200 |
| 2-300 GHz | 61 | 0.16 | 0.20 | 10 |

The power source may be located in the predetermined space/area monitored by the detection system.

The power source may generate an electromagnetic field with a predetermined high exposure area. This may be determined by the power level of the high power packets transmitted from the power source, the distance from the power source, and/or objects located between the location and the power source such as walls that reduce the power. The high exposure area may be wholly within the predetermined space.

The energy receiving equipment may each comprise one or more receivers configured to receive power from the power source/power transmitters. The energy receiving equipment may comprise at least one receiver in each area/room of the predetermined space that is monitored by the detection system.

The low power packets may have a power level that is lower than the power level of the higher power packets. Thus the power packets may be referred to as higher power packets and lower power packets.

The low power packets may be of a first predetermined power level and the high power packets may be of a second predetermined power level. Wherein at least the first predetermined power level is below a predetermined maximum safe power level for human exposure. The second predetermined power level may be above a predetermined maximum safe power level for human exposure within the monitored space. The safe threshold may be determined by guidelines/international standards on safe levels of nonionizing radiation.

The low power packets may have a power level that is below a first predetermined threshold. The first predetermined threshold may be a transmitted power level that results in a generated EM field (even in very close proximity to the transmitter) being below a reference level defined in the ICNIRP guidelines (e.g. the ICNIRP guidelines for limiting exposure to time-varying electric, magnetic and electromagnetic fields up to 300 GHz, as published in HEALTH PHYSICS 74 (4):494-522; 1998, or in the IEC 62311 and IEC 62479 international standards).

Such reference levels are frequency dependent and thus depend on the wireless power transfer technology being used; e.g. for a 2.4 GHz field, the reference levels may be: electric field strength less than 61 V/m; magnetic field strength less than 0.16 A/m; and power density less than 10 W/m2. The first predetermined threshold may be a transmitted power level that results in the generated field anywhere within the predetermined space being below a reference level defined in the ICNIRP guidelines, including but not limited to, the examples listed in Table 1 below.

Table 1: Reference levels for general public exposure to time-varying electric and magnetic fields (unperturbed rms values)

The first predetermined threshold may be a transmitted power level that results in a generated EM field being below a plurality of reference levels defined in the ICNIRP guidelines (e.g. electric field strength, magnetic field strength and power density).

The high power packets may have a power level above the first predetermined threshold but below a second predetermined threshold. The second predetermined threshold may be a transmitted power level at which the generated EM field outside of a predetermined area monitored by the detection system (i.e. immediately outside the predetermined space/area) is below any one of the above mentioned reference levels, e.g. as defined in the ICNIRP guidelines. In this way, radiation exposure for a person just outside of the predetermined area can be kept within safe limits, irrespective of the state of the intruder alarm.

In other words, the high power packets may have a power level above the first threshold which means that the generated EM field within the area monitored by the detection system is not necessarily safe for humans (but it may be ensured that no one is inside the area using the intruder alarm) yet a power level below a second threshold which ensures that the generated EM field immediately outside the area monitored by the detection system is safe for humans (where no checks may be made whether a person is present).

The second threshold may be determined by a field strength measurement outside of the predetermined area.

The power level of the high power packet may be determined based on a measurement of the power received by the power receiving equipment. The measurement received by the power receiving equipment may be a power received at power receiving equipment which is most distant from the power source. Such a measurement may be used to ensure that power level outside the predetermined area is below a predetermined threshold as discussed above.

The low power packets may be safely transmitted with a person anywhere in the predetermined area/space. The high power packets may not be safely transmitted with a person in the predetermined area/space and/or the high exposure area. However, the high power packets may be safely transmitted even if there is a person immediately outside the predetermined area/space. The predetermined power level of the high and/or low power packets may be based on any one or a combination of the following factors: power requirement of any devices powered by the wireless transmission system; energy store level, e.g. battery level, of any devices powered by the wireless transmission system; a power measurement at the power receiving equipment (e.g. the power receiving equipment furthest from the power source); a power measurement outside of the predetermined area monitored by the detection system; a power measurement inside of the predetermined area; and/or a distance between the power receiving equipment and the power source.

By devices that are powered by the wireless transmission system, it may be meant that the devices are powered by low and high energy packets that are received at the energy receiving equipment (i.e. wirelessly powered device(s)). Any such devices may be in electrical communication with the energy receiving equipment.

The power receiving equipment, including any receivers may be stationary and fixed (and so their location and distance from the power source may be known).

The system may be retrofit to an existing intruder alarm system. The system may also be retrofit using an existing Wi-Fi router. By retrofitting the system in this way, the system may be incorporated into a building more easily. Repurposing existing equipment can ease the deployment of the wireless power transmission system.

The system may comprise one or more devices that require wireless power (i.e. wirelessly powered device(s)) and are powered by low and high power packets received at the energy receiving equipment (hereinafter referred to as "devices"). As mentioned these devices may include the intruder alarm, detection system and/or any sensors/detectors therein and/or devices that are not part of the intruder alarm. The devices that require power may comprise an energy store that is electrically connected to the energy receiving means, such as a receiver of the energy receiving means.

The system may only transmit power when it is determined that power is required by one or more devices such as those mentioned above. This may be when a device requires power and/or the energy store level is below a certain level. The system may be arranged to monitor the power requirement of one or more devices.

The system may comprise a controller, i.e. a control unit. The controller may be used to set the intruder alarm system and turn it off. The controller may also be used to monitor power requirements, determine that power is required and send requests for power as described below.

The system may comprise a power monitor. The power monitor may be part of the controller/control unit. The power monitor may be for monitoring the power required by one or more, or all the devices mentioned herein; for example, monitoring the charge level of an energy store, e.g. battery, and/or the current and/or expected power requirements for a device/sensor. The controller may receive power requirement data such as charge level from the power monitor.

When the power requirement data indicates that power is required by a particular device, (e.g. if the charge level of a particular device drops below a predetermined amount and/or the device is about to, or is, undertaking a power requiring activity e.g. sending data and/or performing processing), the controller may send a request to the power source to supply power to the device. In this way the power packets may be sent on demand only. This may further limit possible radiation exposure.

The system may be arranged to determine whether high power packet or a low power packet should be transmitted. The system may determine that high power is required if the power level, or the stored charge of a device is below a first (lower) predetermined level.

The system may determine that low power is required if the power level or charge of the device is below a second (higher) predetermined level. If low or high power is required, a request may be sent to the power source to send low or high power packets to the energy receiving means responsible for charging the relevant battery or device that requires power.

If it is determined that a high power packet is required and the intruder alarm is set but not triggered, the system may be configured to send a high power packet.

If it is determined that a high power packet is required but the intruder alarm is set and triggered, or the intruder alarm is off, a lower power packet may be sent instead. This is because in this circumstance, sending a high power packet may not be safe.

If it is determined that a low power packet is required, a low power packet may be sent. This may be irrespective of the condition of the intruder alarm. The system may therefore be configured to send low power packets irrespective of, and without checking, a condition of the intruder alarm.

If it is determined that a high power packet is required, the system may be configured to only then check a condition of intruder alarm, as described above. Rather than determining whether a high power packet or a low power packet is required, the system may be configured to determine whether any devices require power. Determining whether any devices require power may be achieved by the controller and/or power monitor determining that a device requires power. This may be due to receiving a request for power from the device (i.e. the device sending a request for power), monitoring the power level of an energy store of the device and/or monitoring the operations of the device.

The system may be arranged so that if it is determined that a device of the system requires power, it determines whether a high or low power packet can be sent. This may include determining whether the intruder alarm is set or off. If the intruder alarm is off, the system may be arranged to send a low power packet to the device that requires power.

If the intruder alarm is set, the system may be arranged to check whether the intruder alarm is triggered.

If the intruder alarm is set and triggered, the system may be arranged to send a low power packet to the device that requires power.

If the intruder alarm is set but not triggered, the system may be arranged to send a high power packet to the device that requires power. The system may be arranged to check that a high power packet is required before sending such a high power packet. If the intruder alarm is set but not triggered, the system may determine whether a high or low power packet is required. If a high power packet is required a high power packet may be transmitted. If a low power packet is required a low power packet may be transmitted.

If the intruder alarm is set and triggered, the system may be arranged to send low power packets to one or more certain devices of the system/intruder alarm, without first determining whether the device requires power. This may be to ensure that certain devices, e.g. a video camera, have power during a critical time of a potential intruder.

Individual power transmitters of the power source may be transmitters that may selectively transmit power only when required (e.g. if power is required in a particular room or predetermined area).

Any or all of the devices, power monitor, controller, power source and intruder alarm may be in communication with one another. This may be achieved using wireless communication.

The system may be arranged so that low power packets can be transmitted regardless of the intruder alarm status (i.e. whether it is set, off or triggered) and/or regardless of a detected human presence.

High power packets may be sent only after a predetermined time of the alarms system being set; for example 10s, 20 s or 30 s. In this way, persons in the predetermined space/area have time to leave the space/area after the alarm system is set but before the power source can transmit power.

The intruder alarm and/or controller may comprise a user interface for setting the alarm, turning the alarm off and indicating the status of the intruder alarm and/or devices powered by the system.

The intruder alarm may operate in a plurality of predetermined areas e.g. on a room by room basis, such that high power packets can be sent in a first area where no person is detected and the intruder alarm is triggered but not in a second area if a person is detected in the second area.

According to a second aspect, the present invention provides a method of transmitting wireless power, the method comprising: providing an intruder alarm for monitoring a predetermined area for the presence of a person, wherein the intruder alarm is triggered when the intruder alarm is set and a detection system of the intruder alarm is activated; providing a power source for wirelessly transmitting power to energy receiving equipment, wherein the power source is configured to transmit high power packets and low power packets; and transmitting high power packets only if the intruder alarm is set and not triggered.

The method according to the second aspect (optionally including one or more or all of the below described optional features) may be performed using the system (optionally including one or more or all of the optional features) of the first aspect. The system of the first aspect (optionally including one or more or all of the optional features) may be used to perform one or more steps of the method of the second aspect (optionally including one or more or all of the below described optional features). Thus any of the above described features in relation to the first aspect, including optional features, may be applicable to the second aspect. Any of the below described features of the second aspect, including optional features, may be applicable to the first aspect.

The method may comprise the setting, turning on, or arming, of the intruder alarm by a user.

The method may comprise retrofitting the power source and/or energy receiving equipment to an existing intruder alarm.

The method may comprise sending low power packets when the alarm is set and triggered and/or when the alarm is off.

The method may comprise receiving high power and low power packets at the energy receiving equipment.

The transmitting of power from the power source may comprise generating an RF electromagnetic field.

The method may comprise providing any of the devices that require power described herein.

The method may comprise powering any of the devices described herein using power from the power source that is received at the energy receiving equipment.

The method may comprise monitoring and/or receiving a demand for power for one or more devices. The system may only transmit power when it is determined that power is required by one or more devices. This monitoring may comprise the monitoring of power requirement of individual devices and/or monitoring the power level of batteries of individual devices.

The method may comprise determining a high exposure area where high power packets have a power level above a predetermined threshold. This may be determined based on the power of the high power packets transmitted from the power source, the distance from the power source, and/or objects located between the location and the power source such as walls that may reduce the power.

The method may comprise determining a predetermined power level of the low power packets. The predetermined power level may be below a first predetermined threshold. The first predetermined threshold may be a transmitted power level that results in a generated EM field being below any of the reference levels described above in relation to the first aspect (e.g. as defined in the ICNIRP guidelines)

The transmission of power packets below the first predetermined threshold may be safe for human exposure within the predetermined space/area.

The method may comprise determining a predetermined power level of the high power packets. The predetermined power level may be above the first threshold yet below a second predetermined threshold. The second predetermined threshold may be a transmitted power level at which the field outside of the predetermined area monitored by the detection system is below any of the above mentioned reference levels, e.g. as defined in the ICNIRP guidelines.

The transmission of power packets above the first predetermined threshold may not be safe for human exposure within the predetermined space/area.

The predetermined power level of the high and/or low power packets may be based on any one or a combination of the following factors: power requirement of any devices powered by the wireless transmission system; battery level of any devices powered by the wireless transmission system; a power measurement at the power receiving equipment (e.g. the power receiving equipment furthest from the power source); a power measurement outside of the predetermined area monitored by the detection system; a power measurement inside of the predetermined area; and/or distance between the power receiving equipment. In this way the power packets may be set to the minimum required power level for the required power, thus further reducing radiation exposure.

The method may comprise sending a request to the power source to supply power to a device (this request may be sent by a controller, power monitor and/or wirelessly powered device). In this way the power packets may be sent on demand only, further limiting possible radiation exposure.

In a similar manner, the method may comprise selecting individual power transmitters of the power source to transmit power when a request for power is received (e.g. if power is required in a particular area/room of the predetermined space, the method may comprise selecting a transmitter in that room).

The method may comprise noting a request for power. The method may then comprise determining (e.g. using a controller) whether the intruder alarm is set.

If the intruder alarm is not set, the method may comprise sending (i.e. transmitting) low power packet(s) (i.e. that are considered safe for human exposure).

If the intruder alarm is not set, the method may comprise determining (e.g. using the controller) whether the intruder alarm is triggered.

If the intruder alarm has been set and has been triggered, the method may comprise sending (i.e. transmitting) low power packet(s) (i.e. that are considered safe for human exposure).

If the intruder alarm has been set and not been triggered, the method may comprise sending high power packet(s) (i.e. that are not considered safe for human exposure). The method may comprise determining (e.g. using the controller) that a certain time period has passed since the intruder alarm was set before sending the high power packet(s). This is to ensure that people have sufficient time to leave the space after setting the alarm before high power packet(s) start being sent.

Thus in summary, the system and method may comprise using information from the intruder alarm (i.e. whether it is set and whether it is triggered) to control a power source for wirelessly transmitting power to devices within the space covered by the intruder alarm.

BRIEF DESCRIPTION OF THE DRAWINGS

Certain example embodiments will now be described by way of example only and with reference to the accompanying drawings, in which.

DETAILED DESCRIPTION OF THE INVENTION

Figure 1:
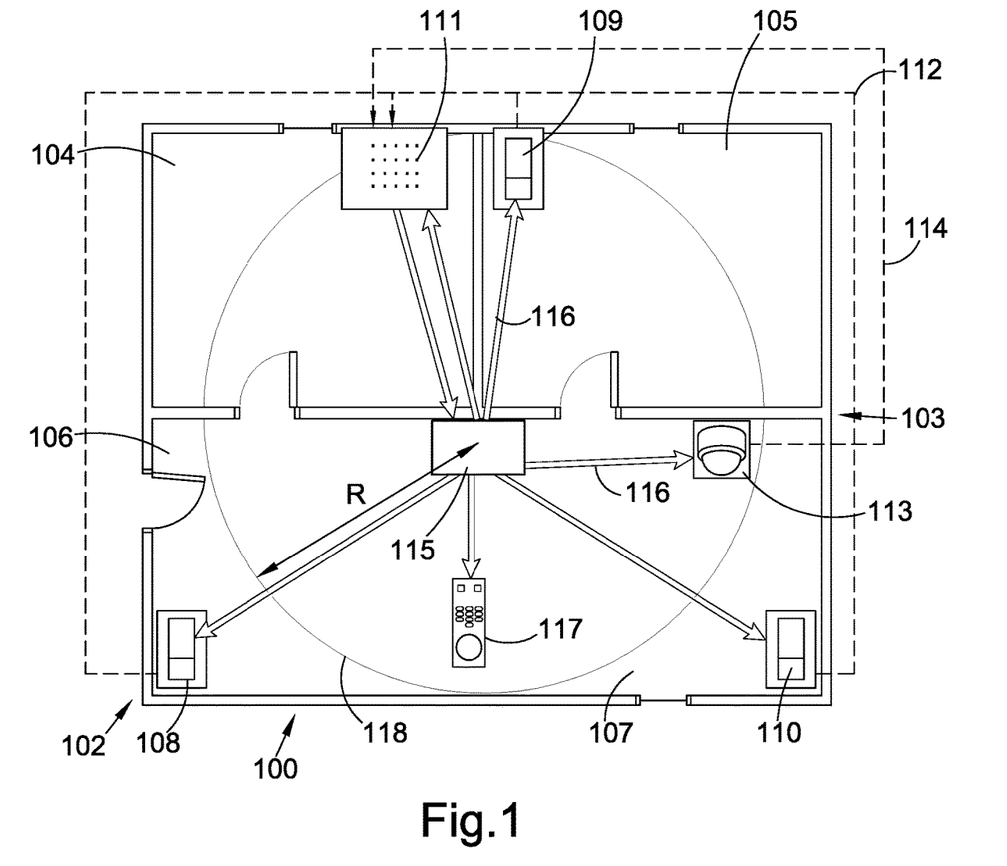
FIG. 1 shows a schematic view of a wireless power transmission system for transmitting power to energy receiving equipment.

A wireless power transmission system 100 is shown in FIG. 1; the wireless power transmission system comprises an intruder alarm, wherein the intruder alarm comprises a person detection system 102 for monitoring a predetermined space 103. The predetermined space 103 comprises the interior of a house, which itself comprises three rooms 104, 105, 106 (i.e. three areas).

The intruder alarm comprises the person detection system 102 in the form of a plurality of passive infrared detectors 108, 109, 110. There is a passive infrared detector in each room 104, 105, 106 of the predetermined area. The intruder alarm also comprises a control unit 111 with a user interface. The control unit 111 is in wireless communication 112 with the three passive infrared detectors 108, 109, 110.

The control unit 111 and user interface can be used by the user to monitor the status of the intruder alarm and turn the alarm on/off.

When the intruder alarm is on (i.e. set/armed), the passive infrared detectors 108, 109, 110 monitor each of the three rooms 104, 105, 106 for the presence of any person, in particular the motion of a person. If a person is detected, a signal is sent from the relevant passive infrared detector(s) to the control unit 111 via the wireless connection 112, indicating the presence of a person and the room/location in which they were detected. The control unit 111 then triggers the intruder alarm.

The intruder alarm also comprises a second person detection system in the form of a video camera 113 that is also in wireless communication 114 with the control unit 111. The video camera monitors one of the rooms 107 in the predetermined area for the presence of a person, and sends signals in the same way as described above.

The wireless power transmission system also comprises a power source in the form of a wireless Wi-Fi router 115. The wireless router 115 is also in wireless communication with the control unit 111.

The wireless router 115 is configured to wirelessly transmit power packets 116. These may be high power packets that are not safe for human exposure or low power packets that are safe for human exposure.

Each of the passive infrared detectors 108, 109, 110 and the video camera 113 are configured to be wirelessly powered by the wireless router 115. They each comprise energy receiving equipment in the form of a receiver and a battery that is electrically connected to the receiver and powers the device and/or stores energy to later power the device. The battery is charged when high and low power packets arrive at the receiver.

An additional wirelessly charged device 117 is also shown in FIG. 1; in this embodiment this additional device 117 is a thermostat for controlling the climate of the rooms 106, 107 108, however, the device 117 may be any one or more device that may be wirelessly powered. The device 117 is configured to also receive wireless power in the same manner as described above in relation to the passive infrared detectors and the video camera.

Also shown in FIG. 1 is a high exposure area 118 within a certain radius R of the wireless router 115. This high exposure area 118 is the area in which radiation exposure form a high power packet transmitted by the wireless router exceeds a predetermined amount, such as that defined in the IEC 62311 and IEC 62479 international standards. The high exposure area 118 can be determined based on the power of the high power packets, distance from the wireless router 115 and/or by taking into account other objects such as walls that are present and absorb some proportion of the radiation. The high exposure area 118 is wholly within the space 103 monitored by the intruder alarm.

When the control unit 111 receives an indication from the person detection system(s) that a person is present in the predetermined area and triggers the intruder alarm, it may send a signal to the wireless router 115 preventing it from sending high power packets. Instead, the wireless router 115 can only send low power packets to power the passive infrared detectors 108, 109, 110, video camera 113 and any other devices 117.

When any of the passive infrared detectors 108, 109, 110, video camera 113 and any other devices 117 require power, the relevant device sends a signal to the control unit 11 indicating a need for power and the control unit 111 then sends a request to the wireless router 115 for power to be sent. The request may be for high or low power packets depending on the power requirement of the device.

Figure 2:
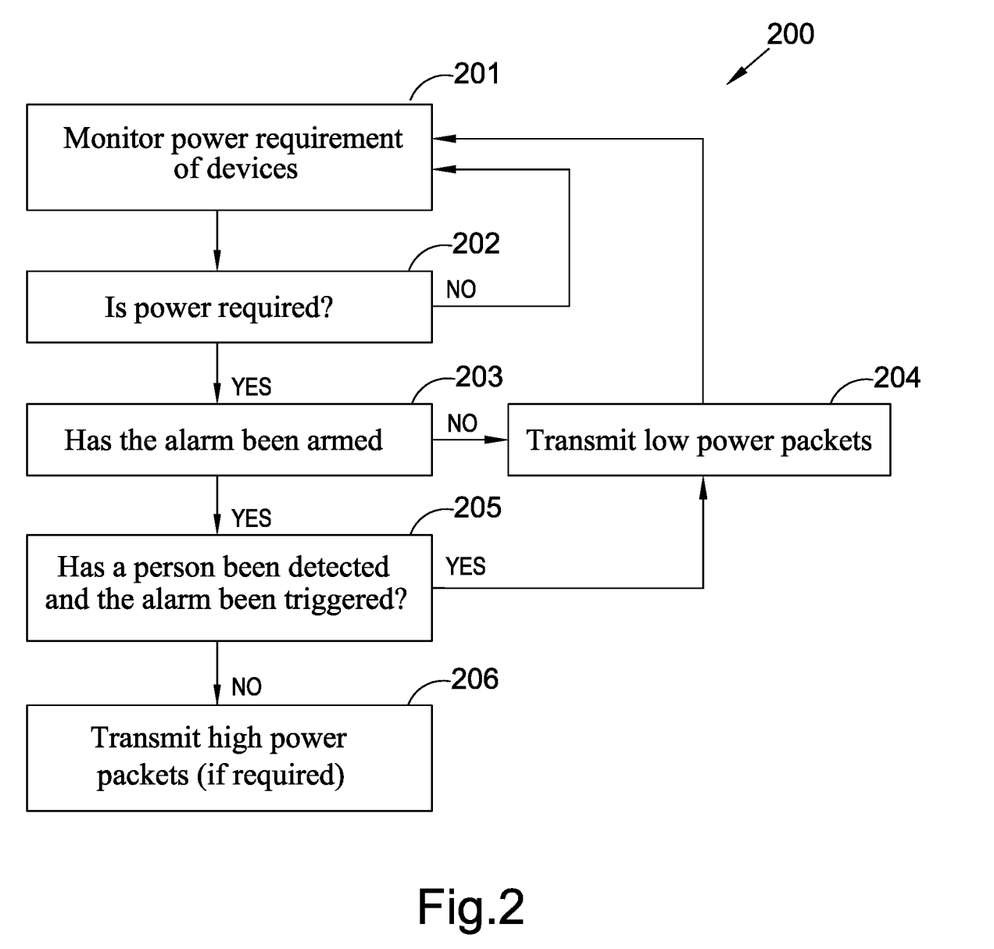
FIG. 2 shows a flow chart of a method of transmitting wireless power using the wireless power transmission system shown in FIG. 1.

FIG. 2 shows a flow chart of a method 200 of transmitting wireless power using the wireless power transmission system 100 described above in relation to FIG. 1.

The method begins at step 201, where the power requirement of any devices powered by the system is monitored. The devices include the sensors of the person detection systems (the passive infrared sensors 108, 109, 110 and the video camera 113), the control unit 111 and the thermostat 117. As discussed, each of the devices is powered by a rechargeable battery which is electrically connected to a receiver that acts as the energy receiving means for receiving the high power and low power packets from the Wi-Fi router 115. The monitoring of the power requirement for each device may be based on a detected charge level of the battery responsible for powering each respective device and/or current or expected power usage of the device. In addition, or alternatively, the power requirement of any devices powered by the system could be monitored by a user.

The method then proceeds to step 202, where (based on the monitored power requirement of any devices powered by the system) it is determined whether power is required by one or more of the devices. If power is not required, the method returns to step 201, monitoring the power requirement of the devices.

If power is required by one or more devices, a request for power is sent and the method proceeds to step 203.

At step 203, it is determined whether or not the intruder alarm has been armed (i.e. turned on/set). If the intruder alarm has not been armed, the method proceeds to step 204 and lower power packets are sent in response to the request for power in order to reduce the risk of exposure of any persons to high power packets. Low power packets are still transmitted in order to fulfill some (but possibly not all) of the power requirement for the device whilst still reducing radiation exposure of persons that may be in the predetermined area to below a safe level. This is particularly important in security systems such as that described above because person detection systems should still have power supplied to them in order to be able to operate and monitor for any intruders once the alarm is armed.

Following the transmission of the low power packets, the method then returns to step 201, monitoring the power requirement of the devices.

If, at step 203, it is determined that the alarm has been armed, the method proceeds to step 205. At step 205, it is checked whether or not a person has been detected in the predetermined area by the person detection system and the intruder alarm has been triggered as a result. If so, the method proceeds to step 204 discussed above, where low power packets are transmitted, thus preventing the exposure of any persons to high power packets. Low power packets are still transmitted in order to fulfill some (but possibly not all) of the power requirement for the device whilst still reducing radiation exposure of persons that may be in the predetermined area to below a safe level. This is particularly important in security systems such as that described above because person detection systems should still have power supplied to them in order to operate and monitor any intruders. For example, in the case of an intruder triggering the alarm, low power packets could still be sent to the video camera 113 in order to allow capture or streaming of video evidence of the intruder.

If no persons have been detected by the person detection system and so the alarm has not been triggered, the method can proceed to step 206 where the Wi-Fi router 115 transmits high power packets to fulfill the power requirement of the one or more devices. The method then returns to step 302 to continue to monitor the power requirement of the devices.

Step 206 may also include making a determination about whether or not high power packets are required. For example, high power may be required if the charge of the device is below a predetermined level. If high power packets are not required, low power packets may be sent instead. This may avoid the unnecessary sending of high power packets, thus potentially increasing the efficiency of the system.

Figure 3:
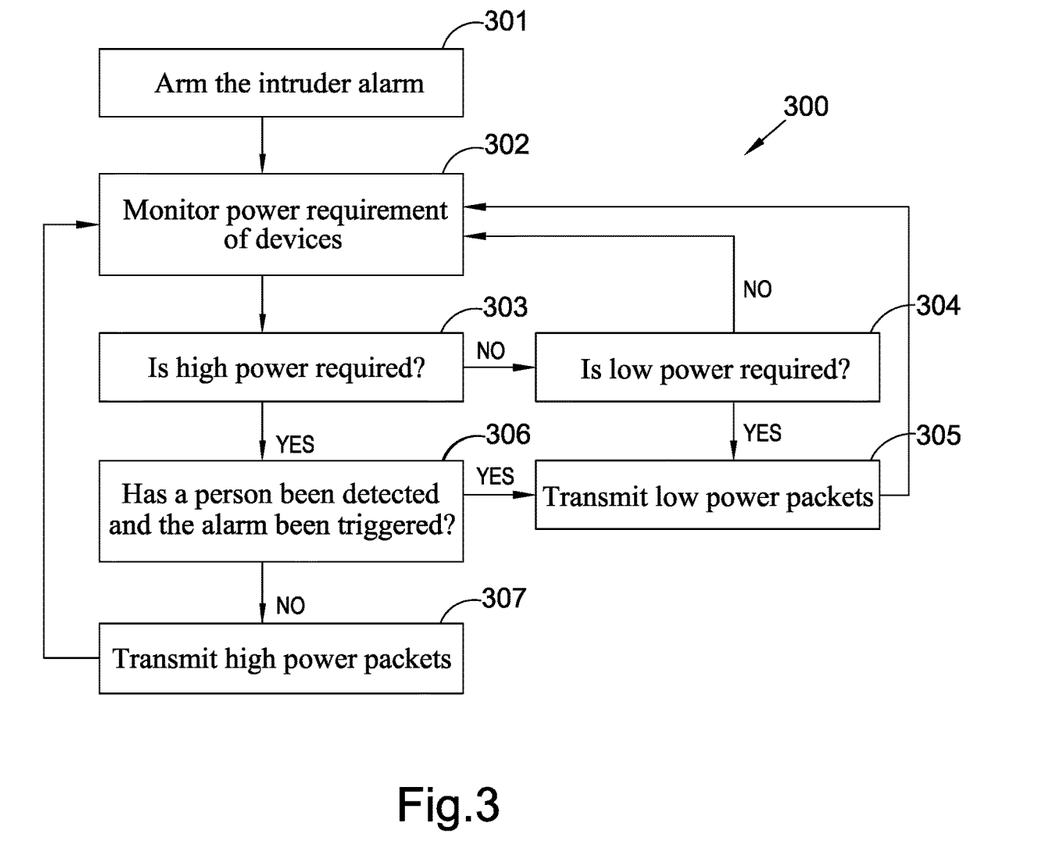
FIG. 3 shows a flow chart of an alternative or additional method of transmitting wireless power using the wireless power transmission system shown in FIG. 1

FIG. 3 shows a flow chart of a method 300 of transmitting wireless power using the wireless power transmission system 100 described above in relation to FIG. 1. The method described below may be used as an alternative to, or in conjunction with, that described in relation to FIG. 2.

The method 300 begins at step 301 when a user turns on, or arms, the intruder alarm of the system. The user may arm the system using the user interface of the control unit as described above. The user then has a period of time, e.g. 30 s, to leave the predetermined space before the intruder alarm starts monitoring the predetermined space using the person detection systems described above and before the system can transmit high power packets.

Once the system has been armed, the method proceeds to step 302, where the power requirement of any devices powered by the system is monitored. The devices include the sensors of the person detection systems (the passive infrared sensors 108, 109, 110 and the video camera 113), the control unit 111 and the thermostat 117. As discussed, each of the devices is powered by a rechargeable battery which is electrically connected to a receiver that acts as the energy receiving means for receiving the high power and low power packets from the Wi-Fi router 115. The monitoring of the power requirement for each device may be based on a detected charge level of the battery responsible for powering each respective device and/or current or expected power usage of the device.

The method then proceeds to step 303, where it is determined whether high power is required by one or more of the devices. High power may be required if the charge of the device is below a first (lower) predetermined level.

If high power is not required it is determined at step 304 whether or not power low is required by one or more of the devices. Low power may be required if the required if the charge of the device is above the first (lower) predetermined level but below a second predetermined level (wherein the second predetermined level is higher than the first). If low power is required, a signal is sent to the wireless router to send low power packets to the energy receiving means responsible for charging the relevant battery of the device that requires low power. The method then proceeds to step 305 and low power packets are sent. There is no need to check for persons in the area in this case as the low power packets are of a low enough power that they are considered safe.

Once low power packets have been sent, the method returns to step 302, monitoring the power requirement of devices.

If it is determined at step 304 that low power is not required, the method returns to step 302 and continues to monitor the power requirement of the devices.

If, at step 303 it is determined that high power is required by one or more of the devices, the method proceeds to step 306. At step 306, it is checked whether or not a person has been detected in the predetermined area by the person detection system and the intruder alarm has been triggered as a result. If so, the method proceeds to step 305 where low power packets are transmitted, thus preventing the exposure of any persons to high power packets. Low power packets are still transmitted in order to fulfill some (but possibly not all) of the power requirement for the device whilst still ensuring radiation exposure of persons in the predetermined area to be below a safe level. This is particularly important in security systems such as that described above because person detection systems should still have power supplied to them in order to operate and monitor any intruders. For example, in the case of an intruder triggering the alarm, low power packets could still be sent to the video camera 113 in order capture video evidence of the intruder.

If no persons have been detected by the person detection system and so the alarm has not been triggered, the method can proceed to step 307 where the Wi-Fi router 115 transmits high power packets to fulfill the power requirement of the one or more devices. The method then returns to step 302 to continue to monitor the power requirement of the devices.

What is claimed is:

1. A wireless power transmission system for transmitting power to energy receiving equipment, the system comprising:
    an intruder alarm, wherein the intruder alarm comprises a detection system that is arranged to trigger the intruder alarm when the intruder alarm is set and the detection system is activated;
    a power source for wirelessly transmitting high power packets and low power packets; and
    energy receiving equipment for receiving the high power packets and low power packets from the power source, wherein the system is arranged such that the power source can only transmit high power packets when the intruder alarm is set and not triggered.

2. The wireless power transmission system of claim 1, wherein the system is arranged such that the power source can transmit low power packets when the intruder alarm is set and triggered and/or when the intruder alarm is off.

3. The wireless power transmission system of claim 1, wherein the person detection system comprises one or more detectors arranged to detect a person in a predetermined space in order to trigger the intruder alarm, wherein the detectors are arranged to be powered by receiving low and high power packets at the energy receiving equipment.

4. The wireless power transmission system of claim 1, wherein the power source is a Wi-Fi router.

5. The wireless power transmission system of claim 1, wherein the detection system monitors a predetermined space, the low power packets are of a first predetermined power level and the high power packets are of a second predetermined power level, and wherein the first predetermined power level is below a predetermined maximum safe power level for human exposure inside of the predetermined space.

6. The wireless power transmission system of claim 5, wherein the second predetermined power level is below a second predetermined maximum safe power level for human exposure outside of the predetermined space.

7. The wireless power transmission system of claim 1, comprising a power monitor for monitoring the power required by one or more devices powered by the wireless transmission system, wherein the system is configured to only send power packets when it is determined that they are required by the devices based on the monitored required power.

8. The wireless power transmission system of claim 7, wherein the system is arranged to send high power packets only when high power packets are required by one or more of the devices.

9. The wireless power transmission system of claim 1, wherein all of the components of the intruder alarm are powered wirelessly by the power source.

10. The wireless power transmission system of claim 1, wherein other devices are powered in addition to the intruder alarm.

11. A method of transmitting wireless power, the method comprising:
    providing an intruder alarm for monitoring a predetermined area for the presence of a person, wherein the intruder alarm is triggered when the intruder alarm is set and a detection system of the intruder alarm is activated;
    providing a power source for wirelessly transmitting power to energy receiving equipment, wherein the power source is configured to transmit high power packets and low power packets; and
    transmitting high power packets only if the intruder alarm is set and not triggered.

12. The method of claim 11, comprising transmitting low power packets if the intruder alarm is set and triggered and/or if the intruder alarm is off.

13. The method of claim 11, comprising monitoring the power requirement of one or more devices powered by the power source, determining power is required and sending a power request to the power source in order to transmit power.

14. The method of claim 13, comprising determining if low power or high power packets are required by one or more of the devices based on the monitored power requirement and transmitting high power packets only if high power packets are required.

15. The method of claim 11, wherein the method comprises retrofitting power receiving equipment to an existing intruder alarm, retrofitting power transmitting equipment to an existing Wi-Fi router such that the Wi-Fi router acts as the power source and/or retrofitting a controller arranged to control the power transmission from the power source based at least partly on whether or not the intruder alarm has been triggered.

* * * * *